United States Patent [19]

Hirota

[11] Patent Number: 4,761,918
[45] Date of Patent: Aug. 9, 1988

[54] WORK RECIPROCATED SURFACE GRINDING APPARATUS

[75] Inventor: Hisashi Hirota, Ichikawa, Japan

[73] Assignee: Nippon Thompson Co., Ltd., Japan

[21] Appl. No.: 893,066

[22] Filed: Aug. 4, 1986

[30] Foreign Application Priority Data

Aug. 3, 1985 [JP] Japan ............................. 60-170581

[51] Int. Cl.⁴ .............................................. B24B 7/17
[52] U.S. Cl. ......................................... 51/114; 51/41;
51/84 R; 51/283 E
[58] Field of Search ............. 51/109 R, 111 R, 113 R,
51/114 R, 40, 41, 80 R, 80 A, 83 R, 84 R, 283
E, 3, 5 D, 5 R, 326, 327

[56] References Cited

U.S. PATENT DOCUMENTS

| | | | |
|---|---|---|---|
| 1,876,178 | 9/1932 | Teschel et al. | 51/84 R |
| 2,170,687 | 8/1939 | Johnson | 51/80 A |
| 2,252,877 | 8/1941 | Baldenhofer | 51/3 |
| 2,869,288 | 1/1959 | Bretscher | 51/114 |
| 3,305,974 | 2/1967 | Wilson | 51/114 |
| 4,481,739 | 11/1984 | Suzuki | 51/80 R |

Primary Examiner—Frederick R. Schmidt
Assistant Examiner—Robert A. Rose
Attorney, Agent, or Firm—Thomas S. MacDonald; Alan H. MacPherson; Paul J. Winters

[57] ABSTRACT

A grinding apparatus suitable for use in forming a straight groove on the surface of a work to be processed includes a carriage provided to be movable along a predetermined path in a reciprocating manner between a first end position and a second end position. Each of the first and second end positions is defined as a loading-/unloading position. A pair of finish grinding discs is located at the center of and on both sides of the predetermined path. A pair of rough grinding discs is located between the first end and center positions of the path and another pair of rough grinding discs is similarly located between the second end and center positions of the path. Each of the grinding discs is shiftable in positions between advanced and retracted positions in the direction transverse to the predetermined path. Thus, while the work is moved along the predetermined path reciprocatingly, the work is first subjected to rough grinding and then finish grinding, thereby forming a pair of grooves on opposite surfaces at the same time.

7 Claims, 5 Drawing Sheets

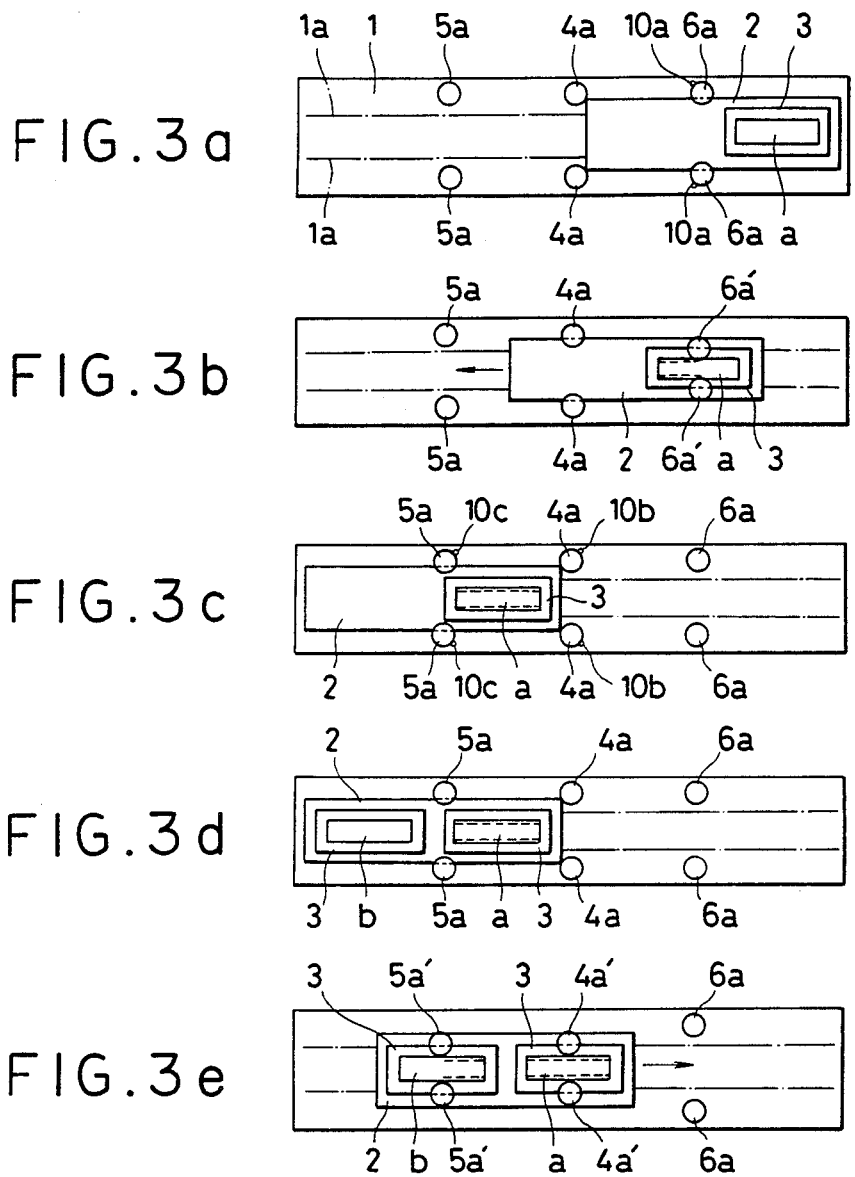

WORK RECIPROCATED SURFACE GRINDING APPARATUS

BACKGROUND OF THE INVENTION

1. Field of the Invention

This invention generally relates to a machining apparatus, and, in particular, to a surface grinding apparatus suitable for use in forming an elongated straight groove by grinding along a surface of a work. More specifically, the present invention is concerned with a surface grinding apparatus for use in forming a straight guide groove along a side surface of a part of a linear motion rolling contact bearing assembly.

2. Description of the Prior Art

A grinding apparatus is widely used and it is also used for forming a straight groove along the surface of a work. In accordance with one typical prior art technique, a plurality of works are transported along a predetermined path as mounted on pallets, during which the works are processed by a grinding apparatus one after another. In accordance with another typical prior art technique, a table for holding a work thereon is provided and this table is reciprocated along a predetermined path so as to subject the work to a grinding operation. In the former case, the grinding operation can be carried out continuously, thereby allowing enhanced operational efficiency; however, since it requires a sophisticated control, the apparatus tends to be expensive and requires close maintenance. On the other hand, in the latter case, there must be provided at least two grinding apparatuses: one for rough grinding and the other for finish grinding. So, the work must be transferred from one grinding apparatus to the other, which is cumbersome. Therefore, there has been a need to develop a grinding apparatus for forming a straight groove on the surface of a work, which is inexpensive but high in performance.

SUMMARY OF THE INVENTION

In accordance with the present invention, there is provided a grinding apparatus for forming a straight groove on the surface of a work. The present grinding apparatus includes a carrier for carrying a work thereon, which moves along a predetermined straight path defined between a pair of loading/unloading positions in a reciprocating manner. Grinding means are provided at three locations along the predetermined path between the pair of loading/unloading positions such that the center grinding means is for finish grinding and both end grinding means are for rough grinding. These three grinding means are spaced apart from each other, preferably equidistantly, along the predetermined path. Thus, a work may be loaded on the carrier while it is stationed at one of the loading/unloading positions, and, then, when the carrier moves in a first direction from one of the loading/unloading positions to the other position along the predetermined path with the work carried thereon, the work is subjected to rough grinding by one of the end grinding means. Upon reaching the other loading/unloading position, the direction of the carrier is reversed so that the work is subjected to finish grinding. Thus, when the carrier returns to the initial loading/unloading position, the finished work can be unloaded, thereby allowing another work to be loaded in place thereof.

In the preferred embodiment, each of the grinding means includes a pair of grinding wheels each located at each side of the predetermined path, so that both side surfaces of a work can be subjected to a grinding operation at the same time. Preferably, these paired grinding wheels are provided to be movable closer to each other or separated from each other along guiding means which extend perpendicular to the direction of movement of the carrier along the predetermined path. Thus, when the carrier moves in the first direction, the end grinding means located closer to the loading/unloading position, from which the carrier starts, is activated to be moved closer to each other, thereby performing a rough grinding operation on the work carried on the carrier. After passing of the carrier, the end grinding means are moved back to their retracted position. And, when the carrier moves in the reversed direction, the center grinding wheels are moved to their advanced position, so that the work is subjected to finish grinding. Preferably, dressing means is also provided for dressing the corresponding grinding wheel.

It is therefore a primary object of the present invention to obviate the disadvantages of the prior art as described above and to provide a novel grinding apparatus for forming a straight groove on the surface of a work.

Another object of the present invention is to provide a grinding apparatus for forming a straight groove on the surface of a work at high efficiency and accuracy.

A further object of the present invention is to provide an inexpensive grinding apparatus suitable for use in forming a pair of guide grooves on the opposite surfaces of a work at the same time.

Other objects, advantages and novel features of the present invention will become apparent from the following detailed description of the invention when considered in conjunction with the accompanying drawings.

BRIEF DESCRIPTION OF THE DRAWINGS

FIGS. 3a through 3i are schematic illustrations useful for explaining the principle of operation of the present grinding apparatus;

DESCRIPTION OF THE PREFERRED EMBODIMENTS

Figure 1:
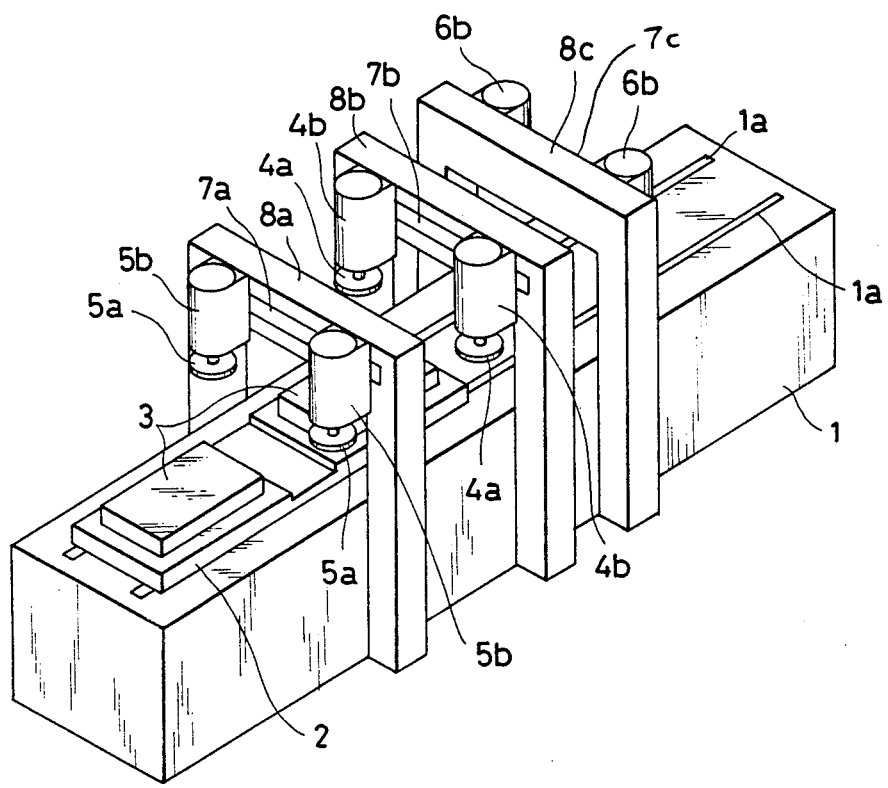
FIG. 1 is a schematic illustration showing in perspective a grinding apparatus for forming a pair of guide grooves on the opposite surfaces of a work at the same time, constructed in accordance with one embodiment of the present invention.
Figure 2A:
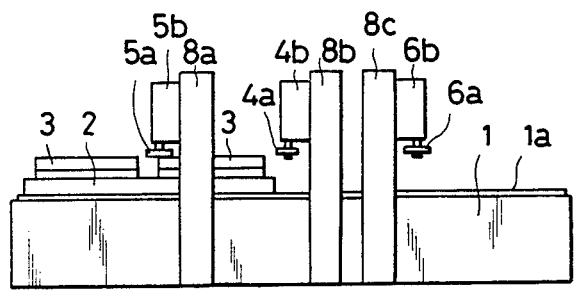
FIGS. 2a and 2b are schematic illustrations showing the grinding apparatus of FIG. 1 in side elevation and in plan view, respectively.
Figure 2B:
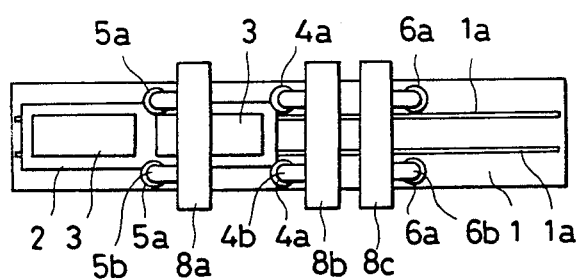
Figure 4:
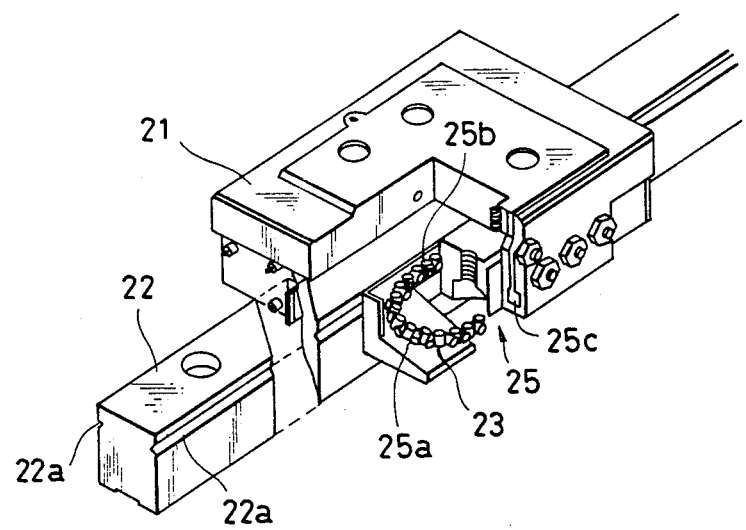
FIG. 4 is a schematic illustration showing in perspective a linear motion rolling contact bearing assembly, which includes at least one component provided with a guide groove which is suitably formed by using the present grinding apparatus.

Referring now to FIG. 1, there is schematically shown a grinding apparatus which is constructed in accordance with one embodiment of the present invention and is suitable for use in forming two straight guide grooves on opposite surfaces of a work. The present grinding apparatus is suitable for use in forming a pair of guide grooves provided in a linear motion rolling contact bearing assembly. One such linear motion rolling contact bearing assembly is schematically shown in FIG. 4. As shown in FIG. 4, the linear motion rolling contact bearing assembly includes a rail 22 extending straight over a predetermined distance, and a slider unit 21 which is slidably mounted on the rail 22. A pair of endless circulating paths 25 (only one of which is shown in FIG. 4) is defined in the slider unit 21 and a plurality of rollers 23 are provided in the endless path. The endless circulating path 25 includes a straight load section 25b, a return section 25c, and a pair of connecting sections 25a each connecting the corresponding ends of the load and return sections 25b and 25c. The rail 22 has a shape of a rectangular rod and it is provided with a pair of guide grooves 22a and 22a on opposite sides thereof. Thus, the rollers 23 interposed between the load section 25b of the slider unit 21 and the corresponding guide groove 22a provides a rolling contact between the slider unit 21 and the rail 22, so that the slider unit 21 can slidably move along the rail 22 as long as the rail 22 extends.

In such a linear motion rolling contact bearing assembly as shown in FIG. 4, the guide grooves 22a must be formed on opposite side surfaces of the rail 22 and the load section 25b of the endless circulating path 25 for the rollers 23 must also be formed in the shape of a straight groove. It is desirous that these guide grooves can be formed inexpensively and at high accuracy to provide a high-performance linear motion rolling contact bearing assembly at low cost.

Returning to FIG. 1, the present grinding apparatus is especially suited for use in forming a pair of guide grooves on the opposite surfaces of a work, and thus it is particularly suitable for the application of forming the pair of guide grooves 22a and 22a of the rail and also the load sections 25b of the slider unit 21 in the linear motion rolling contact bearing assembly described above and shown in FIG. 4. As shown in FIG. 1, the illustrated grinding apparatus includes an elongated base or bed 1 which has a flat top surface on which is laid a pair of guide rails 1a, 1a extending in parallel over a predetermined distance as spaced apart from each other. A carriage 2 is provided to be movable along the guide rails 1a, 1a in a reciprocating manner by means of any suitable driving means known to those skilled in the art. Thus, the pair of guide rails 1a, 1a defines a predetermined path along which the carriage 2 executes its reciprocating motion. It is to be noted that each end of the pair of guide rails 1a, 1a defines a loading/unloading position as will become clear later.

In the illustrated embodiment, the carriage 2 is elongated in shape and it has a pair of mounting surfaces arranged side-by-side in the direction of movement of the carriage 2. A pallet 3 is detachably mounted on the corresponding mounting surface of the carriage 2. Although not shown specifically, any suitable means may be provided for temporarily clamping the pallet to the carriage, and a work to be processed, such as the rail 22 in FIG. 4, is securely held on the pallet 3. Thus, in the illustrated embodiment, a work to be processed is securely attached to the carriage 2 through the associated pallet 3. Although such an arrangement permits easy handling of the work, it may also be so structured that the work is securely attached to the carriage 2 directly, if desired.

Also provided are three U-shaped holding members 8a through 8c fixedly attached to the bed 1 and spaced apart from each other in the longitudinal direction of the guide rails 1a, 1a. Each of the three U-shaped holding members 8a through 8c is inverted and fixedly attached to the bed 1 in a straddling fashion. Each of the holding members 8a through 8c is provided with a pair of grinding wheels, e.g., 5a, 5a for the left-hand holding member 8a, 4a, 4a for the center holding member 8b, and 6a, 6a for the right-hand holding member 8c. Each of the grinding wheels or discs is supported by an associated driving unit, e.g., the grinding wheel 5a being supported by an associated driving unit 5b. Each of the U-shaped holding members 8a through 8c is also provided with a transverse guide rail 7a, 7b or 7c. And, each of the pairs of driving units 4b and 4b, 5b and 5b, and 6b and 6b is slidably mounted in the corresponding transverse guide rail 7a, 7b or 7c. For example, the pair of driving units 5b and 5b are slidably mounted on the transverse guide rail 7a which is fixedly mounted on the left-hand holding member 8a. Thus, the transverse rails 7a, 7b and 7c each extend in a direction transverse or perpendicular to the longitudinal direction of the guide rails 1a and 1a. The driving units 5b and 5b may thus move closer together toward their advanced position or separated away from each other toward their retracted position along the transverse guide rail 7a. It should also be noted that each of the driving units 4b, 5b and 6b can drive to rotate its associated driving wheel 4a, 5a, 6a. The vertical position of each of the grinding wheels 4a, 5a and 6a can be adjustably determined by the associated driving unit 4b, 5b or 6b.

Although not shown in FIG. 1, it should be noted that a loading/unloading unit is provided at each end of the guide rails 1a, 1a, for loading and unloading the pallet 3 and thus the work supported thereon each time when the carriage reaches the end of its forward or return travel along the guide rails 1a, 1a. Such loading and unloading operation is preferably carried out automatically. In addition, although not shown in FIG. 1, six dressing units, one for each of the grinding wheels 4a, 5a and 6a, are provided in the present grinding apparatus. Each of these dressing units is provided to be movable between an operative position, where the dressing unit engages the associated grinding wheel to have it subjected to dressing operation, and an inoperative position, where the dressing unit is disengaged from the associated grinding wheel. Thus, these dressing units are brought into engagement with the associated grinding wheels selectively to thereby make the associated grinding wheels ready for use in grinding operation in a periodic fashion.

Of importance, the center grinding wheels 4a, 4a include wheels for a finish grinding operation; whereas, the right and left grinding wheels 5a, 5a and 6a, 6a include wheels for a rough grinding operation. As will be made clear later, a work is thus first subjected to a rough grinding operation by either one of the right or left rough grinding wheels 5a, 5a or 6a, 6a, and, then, the half-finished work is subjected to a finish grinding operation by the center finish grinding wheels 4a, 4a. Although not shown for the sake of brevity, it should also be noted that sensors are preferably provided to regulate the reciprocating motion of the carriage 2 along the guide rails 1a, 1a and also each of the driving units 4b, 5b and 6b along the associated transverse guide rail 7a, 7b or 7c. Furthermore, it is preferably so structured that each of the driving units may be set to be inclined with respect to the vertical line.

Figure 3F:
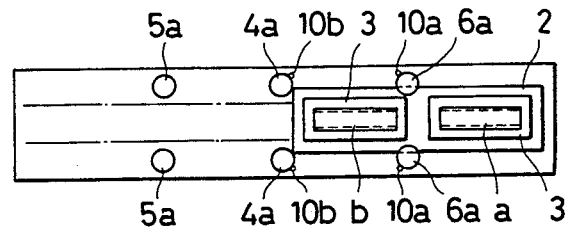

The operation of the present grinding apparatus will now be described with particular reference to FIGS. 3a through 3i. FIG. 3a shows the initial state in which the carriage 2 is located at the rightmost position. Under this condition, a pallet 3 supporting thereon a first rectangular work a to be processed is placed on the right-hand mounting surface of the carriage 2 as fixed thereto temporarily. Such a loading operation can be carried out manually, but it is preferably carried out automatically by an loading/unloading unit (not shown). During the loading of the work a onto the carriage 2, a pair of dressing units 10a, 10a is moved closer to come into engagement with the associated grinding wheels 6a, 6a, so that the grinding wheels 6a, 6a are subjected to a dressing operation for a predetermined time period. It should be noted that the movement of the dressing units 10a, 10a and the duration of the dressing operation can be controlled by a control system provided in the present apparatus by any means well known to those skilled in the art.

Then, as shown in FIG. 3b, upon completion of the dressing operation of the grinding wheels 6a, 6a, the carriage 2 is driven to move to the left as indicated by the arrow. At the same time, the pair of grinding wheels 6a, 6a is moved to their advanced position as indicated by primed numbers 6a', 6a'. As described, the pair of grinding wheels 6a, 6a may be moved closer together by moving the associated driving units 6b, 6b along the corresponding transverse guide rail (not shown). Accordingly, the pair of grinding wheels 6a', 6a' come into grinding contact with the opposite side surfaces of the work a as the carriage 2 moves to the left, whereby the opposite side surfaces of the work a are subjected to a rough grinding operation by the grinding wheels 6a', 6a' at the same time, and thus preliminary grooves are formed in the work a as indicated by the dotted lines. Since the work a has moved past the pair of grinding wheels 6a', 6a' only half-way, only the left half of the work a has been subjected to a rough grinding operation in FIG. 3b. As the carriage 2 further moves to the left, a rough grinding operation by the pair of grinding wheels 6a', 6a' is completed along the entire length of the work a.

FIG. 3c shows the condition in which the carriage 2 has reached the leftmost end of its travel. As shown, the pair of grinding wheels 6a, 6a has already been returned to their retracted position. As one example, the movement of the carriage 2 may be detected electrically, mechanically or photoelectrically, and such detected information may be utilized to control the positioning of the grinding wheels 6a, 6a. Since the work a has been completely subjected to a rough grinding operation by means of the pair of grinding wheels 6a, 6a while they are located at their advanced position, preliminary grooves have been formed on the opposite side surfaces of the work a along its entire length. It is to be noted that the pair of grinding wheels 4a, 4a and 5a, 5a remain at their retracted position throughout each of these steps. And, in the illustrated example, upon reaching of the carriage 2 at the leftmost end of its travel, pairs of dressing units 10c, 10c and 10b, 10b are moved closer to come into engagement with the associated grinding wheels 5a, 5a and 4a, 4a, respectively.

Then, as shown in FIG. 3d, another pallet 3 supporting thereon a second work b to be processed is placed on the left mounting surface of the carriage 2 to be fixedly attached thereto temporarily. In this case, although the pallet 3 holding the second work b may be manually attached to the carriage 2, use is preferably made of a pallet exchanger for placing the pallet 3 with the second work b onto the carriage 2 automatically. In the meantime, the dressing operation for the grinding wheels 4a and 5a has been completed, and thus the dressing units 10b and 10c have already been moved back to their retracted position. It is to be noted that, in the illustrated example, the work a is located between the center pair of grinding wheels 4a, 4a and the left pair of grinding wheels 5a, 5a when the carriage 2 is located at the leftmost end of its travel.

Then, as shown in FIG. 3e, the carriage 2 is driven to move to the right as indicated by the arrow. At the same time, the left and center pairs of grinding wheels 5a, 5a and 4a, 4a are moved to their advanced position engageable with the works a and b on the respective pallets 3, 3 as indicated by the primed reference numbers. Thus, as the carriage 2 moves to the right, the first work a, which has already been subjected to a rough grinding operation once, comes to be subjected to a finish grinding operation by the center pair of grinding wheels 4a', 4a', and, at the same time, the second work b comes to be subjected to a rough grinding operation by the left pair of grinding wheels 5a', 5a'. Of importance, in the illustrated embodiment, the two works a and b are processed at the same time, one for a rough grinding operation and the other for a finish grinding operation, and the two opposite surfaces of each of the two works a and b are processed at the same time.

As shown in FIG. 3f, the carriage 2 is then moved to its initial position or rightmost end of its travel, where the finished work a is removed from the carriage 2 together with its supporting pallet 3. This removing operation can be carried out manually, but it is preferably carried out automatically, for example using a pallet exchanger. In the meantime, the pairs of dressing units 10a, 10a and 10b, 10b are moved closer to come into engagement with the associated grinding wheels 6a, 6a and 4a, 4a, thereby effecting the dressing operation. It should also be noted that, in the illustrated example, the second work b is located between the center grinding wheel pair 4a, 4a and the right grinding wheel pair 6a, 6a. It should further be noted that the left and center grinding wheel pairs 5a, 5a and 4a, 4a have been returned to their retracted position.

Figure 3G:
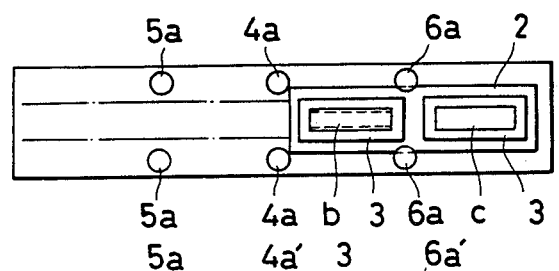

Then, as shown in FIG. 3g, a third work c fixedly supported on its associated pallet 3 is mounted on the right mounting surface of the carriage 2. In FIG. 3g, the dressing operation for the grinding wheels 4a, 4a and 6a, 6a has been completed, and thus the dressing units 10b, 10b and 10a, 10a have already been returned to their retracted position.

Figure 3H:
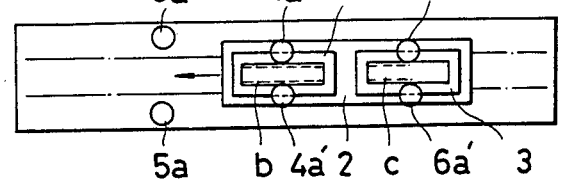

Thereafter, as shown in FIG. 3h, the carriage 2 is again driven to move to the left as indicated by the arrow, in this case with the half-finished second work b and the newly supplied third work c supported thereon. At the same time, the center and right grinding wheels 4a, 4a and 6a, 6a are moved to their advanced position as indicated by the primed reference numerals. Thus, as the carriage 2 moves to the left, the second work b comes to be subjected to a finish grinding operation by the center grinding wheel pair 4a', 4a' and, at the same time, the third work c comes to be subjected to a rough grinding operation by the right grinding wheel pair 6a', 6a'. As may by understood, the step shown in FIG. 3h basically corresponds to the step shown in FIG. 3b;

however, since the second work b is additionally present on the left mounting surface of the carriage 2 in the case shown in FIG. 3h as different from the case shown in FIG. 3b. In the case of FIG. 3h, the center pair of grinding wheels 4a, 4a is also located at its advanced position.

Figure 3I:
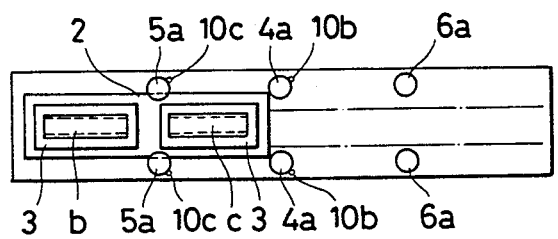

Then, the carriage 2 finally reaches its leftmost end of its travel as shown in FIG. 3i, where the second work b, which has been subjected once to a rough grinding operation and then to a finish grinding operation and, thus completed, is removed from the carriage 2. In the meantime, the center and right pairs of grinding wheels 4a, 4a and 6a, 6a are returned to their retracted position. Thus, the grinding wheels 5a, 5a and 4a, 4a are subjected to a dressing operation to make these grinding wheels ready to use for processing the work and c when the carriage 2 moves to the right the next time. Thus, the next step corresponds to the step shown in FIG. 3d. Thereafter, the above-described steps are repeated excepting the steps shown in FIGS. 3a through 3c to process a desired number of works, basically two at a time.

It is to be noted that the finish grinding wheels 4a, 4a may be driven at the same speed as the rough grinding wheels 5a, 5a and 6a, 6a. In this case, however, other grinding conditions, such as grinder cut-in speed, should be appropriately adjusted between the rough and finish grinders. On the other hand, the grinding speed may be differently set between the rough and finish grinders, if desired.

Figure 5A:
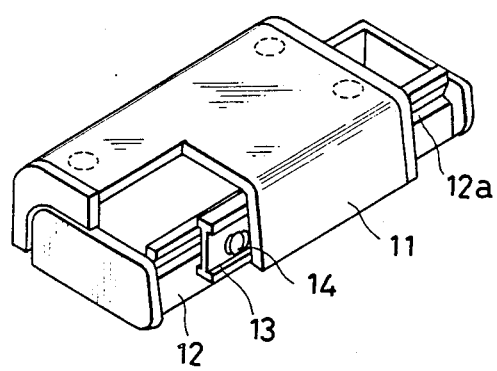
FIGS. 5a and 5b are schematic illustrations showing in perspective and in partial cross-section, respectively, another linear motion rolling contact bearing assembly, at least one component of which is provided with a guide groove which is suitably formed by using the present grinding apparatus.
Figure 5B:
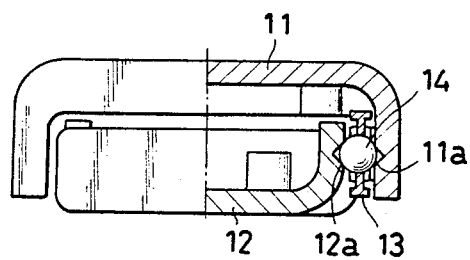

FIGS. 5a and 5b show a linear motion rolling contact bearing assembly employing balls as rolling members, which includes parts preferably processed by the present grinding apparatus. That is, the linear motion rolling contact bearing assembly shown in FIGS. 5a and 5b includes a table 11 having a generally U-shaped cross section, a rail member 12 also having a generally U-shaped cross section, a plurality of balls 14 interposed between the table 11 and the rail member 12, and a ball retainer 13 for retaining the balls 14 spaced apart from each other in position. With this structure, the table 11 can slidably move relative to and along the rail member 12. The table 11 is provided with a pair of outer straight guide grooves 11a (only one of which is shown), and the rail member 12 is provided with a pair of outer straight guide grooves 12a (only one of which is shown). The associated inner and outer guide grooves 12a and 11a extend in parallel and face opposite to each other, thereby defining a passage for the balls 14. In the illustrated example, the inner and outer guide grooves 12a and 11a are both V-shaped in cross section. These guide grooves can be advantageously processed by using the above-described grinding apparatus of the present invention. In this case, if the grinding wheels are comprised of a disc having a flat peripheral grinding surface, then the grinding wheels may be preferably set as inclined with respect to the vertical line, as described before, so as to form V-shaped guide grooves. In addition, the table 11 and rail member 12 are relatively shorter in length, and thus, when processing these components, two or more may be mounted on the same pallet as arranged in a line. In this case, an increased number of components can be processed at the same time.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A grinding apparatus for forming at least one straight groove on a surface of a work, comprising:

carrying means for carrying at least one work to be processed, said carrying means being provided to be movable along a predetermined path in a reciprocating manner between a first end position and a second end position, said carrying means including a pair of spaced mounting sections, each mounting section including means for mounting thereon a work to be processed, and arranged in a line in a direction of movement of said carrying means;

first grinding means located along said predetermined path between said first and second position, said first grinding means being for finish grinding and movable between a retracted position where not engageable with said work which moves along said predetermined path as carried on said carrying means and an advanced position where engageable with said work which moves along said predetermined path as carried on said carrying means;

a pair of second and third grinding means wherein said second grinding means is located along said predetermined path between said first end position and said first grinding means, and said third grinding means is located along said predetermined path between said second end position and said first grinding means, said pair of second and third grinding means being for rough grinding and each movable between a retracted position where not engageable with said work which moves along said predetermined path as carried on said carrying means and an advanced position where engageable with said work which moves along said predetermined path as carried on said carrying means; and whereby said work is first processed by either one of said second or third grinding means and then by said first grinding means as said work moves along said predetermined path as carried on said carrying means in a reciprocating manner, thereby forming a groove on a surface of said work and wherein said first, second and third grinding means are spaced apart from one another such that, when one of said pair of mounting sections is located between said first grinding means and one of said second and third grinding means, the other of said pair of mounting sections is located between the other of said second and third grinding means and a corresponding one of said first and second end positions.

2. The apparatus of claim 1 wherein each of said first through third grinding means includes a pair of grinding elements disposed as spaced apart from each other and also movable in a direction transverse to the direction of movement of said carrying means.

3. The apparatus of claim 2 wherein the pair of grinding elements of said first grinding means are located equidistant from the pair of grinding elements of either of said second and third grinding means.

4. The apparatus of claim 3 wherein said carrying means includes a carriage capable of carrying two works to be processed at the same time.

5. The apparatus of claim 4 wherein each of said works to be processed is fixedly supported on a pallet which in turn can be fixedly attached to said carriage.

6. The apparatus of claim 2 further comprising a bed provided with rail means which defines said predetermined path and supporting means fixedly attached to said bed for supporting said first through third grinding means.

7. The apparatus of claim 6 further comprising a plurality of dressing units each capable of dressing an associated one of said grinding elements.

* * * * *